(12) United States Patent
Solihin

(10) Patent No.: US 9,157,248 B2
(45) Date of Patent: Oct. 13, 2015

(54) DANGER ZONE DETECTION IN BUILDING MODELS

(75) Inventor: Wawan Solihin, Singapore (SG)

(73) Assignee: Autodesk, Inc., San Rafael, CA (US)

( * ) Notice: Subject to any disclaimer, the term of this patent is extended or adjusted under 35 U.S.C. 154(b) by 324 days.

(21) Appl. No.: 13/571,113

(22) Filed: Aug. 9, 2012

(65) Prior Publication Data

US 2014/0046632 A1 Feb. 13, 2014

(51) Int. Cl.
| | |
|---|---|
| *G06F 17/50* | (2006.01) |
| *E04G 21/32* | (2006.01) |
| *G05B 13/00* | (2006.01) |
| *G06Q 10/06* | (2012.01) |
| *G06Q 50/08* | (2012.01) |

(52) U.S. Cl.
CPC ........ *E04G 21/3204* (2013.01); *E04G 21/3223* (2013.01); *G05B 13/00* (2013.01); *G06Q 10/0635* (2013.01); *G06Q 50/08* (2013.01)

(58) Field of Classification Search
CPC .................................................. G06Q 10/0635
USPC .............................................................. 703/1
See application file for complete search history.

(56) References Cited

U.S. PATENT DOCUMENTS 6,058,259 A * 5/2000 Murakami ........................ 703/2

OTHER PUBLICATIONS

Behzadan: Arviscope Geo-referenced Visualization of Dynamic Construction Processes in Three-Dimensional Outdoor Augmented Reality; PhD Thesis, The University of Michigan; 282 pages; 2008.*

Benjaoran et al.: An integrated safety management with construction management using 4D CAD model; Safety Science 48 (2010) pp. 395-403.*

Ghule: Suggested Practices for Preventing Construction Worker Falls ; PhD Thesis; MS; University of Florida; 73 pages; 2008.*

Navon et al.: Model for Automated Monitoring of Fall Hazards in Building Construction; J. Constr. Eng. Manage., 132 (7); 2006.*

Solihin (inventor): Modeling for IFC With Autocad Architecture; Autodesk product tutorial; 52 pages; Apr. 2010.*

Succar: Building information modelling framework: A research and delivery foundation for industry stakeholders; Automation in Construction 18 (2009) pp. 357-375.*

Sulankivi et al.: 4D-BIM for Construction Safety Planning; Conference Paper; 2010. CIB 2010 World Congress, Manchester UK; 12 pages; 2010.*

Sulankivi et al. "BIM-based Site Layout and Safety Planning", Proceedings of the First International Conference on Improving Construction and Use through Integrated Design Solutions, CIB IDS 2009, Jun. 10-12, 2009 Espoo, Finland. VTT Symposium 259; 13 pages; 2009.*

* cited by examiner

*Primary Examiner* — Hugh Jones
(74) *Attorney, Agent, or Firm* — Fish & Richardson P.C.

(57) ABSTRACT

Methods, systems, and apparatus, including computer programs encoded on a computer storage medium, for identifying zones where protections should be installed to prevent people and materials from falling off edges of the building. The system analyzes a building model and building objects completed before a given time, identifies edges of interest for the building objects, determines whether these edges, or their portions, are dangerous, and provides this information to a user.

33 Claims, 9 Drawing Sheets

DANGER ZONE DETECTION IN BUILDING MODELS

BACKGROUND

This specification relates to building information models and computer aided design of buildings, and particularly to detection of dangerous zones in a building under construction that create a risk of workers falling from heights or a risk of falling objects.

Building information management software is often used to prepare a model of a structure, such as a building, while in the design stages and later during construction. The model can include representations of physical elements, such as columns, beams, walls, slabs, and the like that will be included in the structure, and drawings prepared based on such a model can be used in the actual physical construction of the structure. The model may be prepared and edited by various individuals, including architects and structural engineers, for example.

SUMMARY

In general, one aspect of the subject matter described in this specification can be embodied in methods that include the actions of obtaining a model of a building representing the building at a point in time in construction of the building, the model containing a plurality of building objects that are indicated as being present in the building at the point in time by a construction schedule; identifying one or more candidate edges of the building objects, wherein a candidate edge is an outer edge of a slab building object, an edge of an opening in a slab building object, or a lower edge of an opening in a wall building object; analyzing the one or more candidate edges to identify one or more dangerous edges, wherein a dangerous edge presents a risk of falling; and generating a presentation of the building based on the model of the building wherein one or more of the identified dangerous edges are emphasized in the presentation. Other implementations of this aspect include corresponding systems, apparatus, and computer programs.

These and other aspects can optionally include one or more of the following features. Candidate edges can be identified by eliminating shared edges from the candidate edges wherein a shared edge is an edge between two slab building objects whose top surfaces have a same elevation and wherein a gap between the two slab building objects is less than a gap threshold; and eliminating hole edges from the candidate edges when a maximum width of a hole defined by the one or more hole edges is less than a hole threshold; eliminating each of one or more edges from the candidate edges if the edge is the lower edge of an opening in a wall building object having a sill height beyond a sill height threshold.

These and other aspects can optionally include one or more of the following additional features. The one or more candidate edges can be split into candidate segments and analyzing the one or more candidate edges includes analyzing at least one candidate segment separately from the other candidate segments. Two or more of the candidate segments can have equal length.

Also, analyzing the one or more candidate edges can include eliminating one or more protected edges from the candidate edges wherein a protected edge is a candidate edge having a first virtual box containing a protecting object; and wherein the first virtual box is positioned partially on an interior side of the candidate edge and partially on an exterior side of the candidate edge, a bottom face of the first virtual box is a protection height beyond the candidate edge, and an outward-facing wall of the first virtual box is on the exterior side of the candidate edge and is offset a gap distance from the candidate edge. The protecting object can be a wall, a curtain wall, or a railing. Further, analyzing the one or more candidate edges can include eliminating one or more low edges from the candidate edges wherein a low edge is a candidate edge having a second virtual box containing a support which has an area of an intersection with the second virtual box that is at least a support area threshold portion of an area of a bottom face of the second virtual box; wherein the second virtual box is positioned on the exterior side of the candidate edge, a top face of the second virtual box has a same elevation as the candidate edge, a bottom face of the second virtual box is a safe drop distance below the candidate edge, and a width of the second virtual box is a support width threshold; and marking the candidate edges that are not eliminated as dangerous edges. The support can be a slab, a site, or ground. The remaining candidate segments can be marked as dangerous segments; and, if a segment eliminated from the candidate segments has at least one neighboring segment that is a candidate segment, such eliminated segment can be marked as a dangerous segment.

Particular implementations of the subject matter described in this specification can be implemented to realize one or more of the following advantages. At a particular point in time during a building construction cycle, the system automatically evaluates a building information model to identify dangerous edges of building objects constructed by the particular point in time in need of protection to prevent people or materials from falling off these edges. The identified dangerous edges are in emphasized in a presentation of the building to a user of the system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A three-dimensional ("3-D") building information model (or "model") is a digital representation of physical and functional characteristics of a building or other structure and can be created using building information modeling software. The model includes a representation of a building design as a combination of building objects (or "objects"). An object is an element of the building such as, for example, a slab, a wall, a column, a door, or a void-space, (e.g., a shape of a room). Each object is associated with information regarding physical dimensions of the associated physical object, its location in the model of the building and relationship with other objects. Usually the model also includes a construction schedule that indicates points in time in the construction of building when particular objects will be physically present in the building. The construction schedule can include a time sequence in which to construct physical objects corresponding to the objects in the model during the construction of the building. For example, the objects associated with a foundation of the building will be constructed before the objects associated with higher levels of the building. A version of the model can be generated (e.g., using Revit Architecture software available from Autodesk, Inc. of San Rafael, Calif.) such that it contains only those objects that are scheduled to have been constructed or added to the building at a given point in time.

Figure 1:
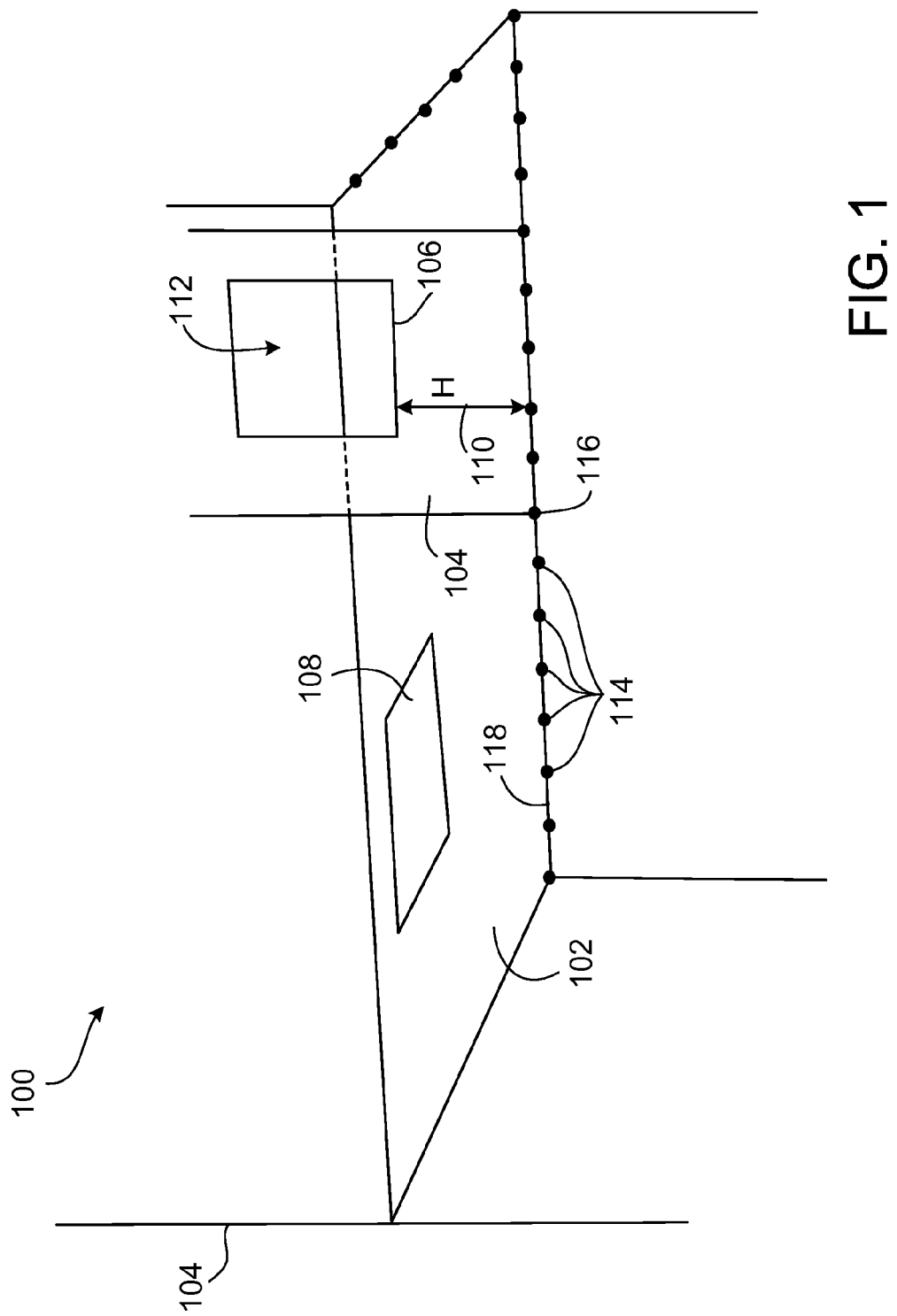
FIG. 1 is an illustration of an example view of a floor in a building information model at a particular point in time during building's construction.

FIG. 1 illustrates an example view of a floor plan 100 for a given floor in a 3-D model of the building at the given point in time in its construction. A floor plan is a diagram showing a view of rooms, spaces and other objects located on a given floor of a building. The 3-D model of the building is generated by the building information modeling software based on the model of the building by a one or more data processing apparatus (e.g., one or more servers) using a building information model of the building. The floor plan 100 shows the building objects completed at the given point in time and related to the given floor, such as slabs (e.g., 102) with their edges (e.g., 118), holes in the slabs (e.g., 108), walls (e.g., 104), openings in the walls (e.g., 112), and other objects.

The process of the present invention identifies one or more dangerous zones on the floor plan 100 which need to have protections installed to prevent people and objects from falling from heights. In order to identify the dangerous zones the system identifies objects that can potentially create a danger of falling, identifies edges of these objects, evaluates the edges to eliminate the edges or parts of the edges not needing protection, and represents results to a user.

After the given time is identified (e.g., by a user or automatically by the system), the system identifies one or more dangerous objects. An object is dangerous if has been constructed by the given time and it is accessible to people or can be used for storing materials on its top surface. In some implementations only slabs, roof slabs and walls are examined to identify dangerous objects. In other implementations other categories of building objects are also examined, when the system identifies dangerous objects.

After the dangerous objects are identified, the system analyzed edges of the dangerous objects to identify candidate edges and, from the set of candidate edges, identify dangerous edges. In some implementations, outer edges of the identified slabs, edges of holes in these slabs, and lower edges of openings in the identified walls are examined to find dangerous zones. In other implementations other types of edges of other categories of dangerous objects are also examined.

In some implementations, when candidate edges are analyzed, the edges (e.g., 118) are split into segments (e.g., 114). Sometimes all of the edges are split into segments of equal length. In other implementations, segment lengths can vary from one edge to another or within an edge. Also, sometimes, a beginning and an end of a segment can be determined by a structure of a building object to which the edge belongs or by position of other building objects in relation to the building object carrying the edge. For instance, when there is a location (e.g. 116) where an edge (e.g., 118) of a slab (e.g., 102) meets a corner of another object, such as a wall (e.g., 104) or a column, such location can be used as a dividing point between two segments.

In some implementations, the edges are analyzed segment by segment, each segment being evaluated independently from the others. Sometimes a mixture of evaluations based on edges and segment-by-segment evaluations is used. Further in the specification, whenever analysis or evaluation of an edge is discussed, the same analysis or evaluation can be applied to the individual segment of that edge.

Initially, all outer edges of slabs, edges of holes in the slabs, and lower edges of holes in the walls are identified as candidate edges, forming a set of candidate edges. Then the candidate edges are analyzed to identify not dangerous edges. If a candidate edge is identified as not dangerous, it is eliminated from the set of candidate edges.

An edge of a slab is a not dangerous edge if it is a shared edge. A shared edge is an outer edge of a slab shared by two slabs, where top surfaces of the two slabs have the same elevation, and a gap between the two slabs is less than a gap threshold. An edge of a hole in a slab is a not dangerous edge if a maximum width of the hole is less than a hole threshold. Also, a lower edge of an opening in a wall is a not dangerous edge if a sill height of the edge exceeds a sill height threshold. A sill height of an opening in a wall is a distance between a lower edge of the opening and a slab supporting the wall.

Figure 2:
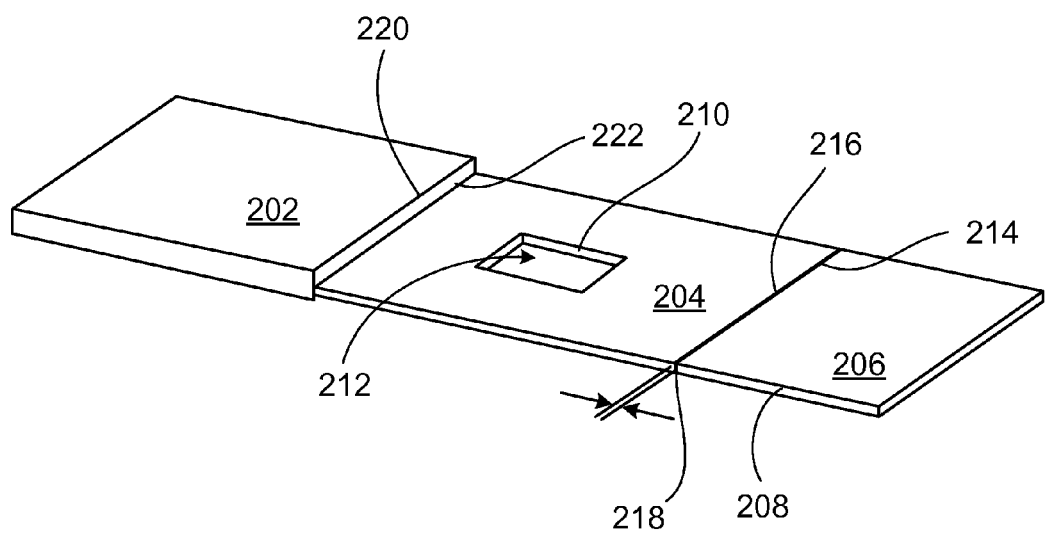
FIG. 2 is an illustration of an example view of slabs of a floor in the model.

FIG. 2 is an illustration of an example view of slabs of a floor in the model which illustrates a process of analyzing the slabs (e.g. 202) to identify not dangerous edges. All edges of the slabs are analyzed, including their outer edges (e.g. 208) and the edges of the holes in the slabs (e.g., 212).

This figure shows three slabs 202, 204, and 206. All outer edges (e.g., 208) of the slabs 202, 204, 206 are analyzed to identify shared edges. For instance, when the edge 208 of the slab 206 is analyzed, the system determines from the information in the model that there are no slabs having their edges closer to the edge 208 than the gap threshold. Therefore the edge 208 is not a shared edge, and the system cannot eliminate this edge 208 from the set of candidate edges.

When the left edge 214 of the slab 206 is analyzed, the system determines that a gap between this edge 214 and the right edge 216 of the slab 204 is less than the gap threshold. The system also determines that the two slabs 204, 206 have the same top surface elevation. As a result, the system determines that these two edges 214, 216 are shared edges, not dangerous edges, and both must be eliminated from the set of candidate edges.

If a slab has holes (e.g., 212), the system analyzes the edges (e.g. 210) of the holes 212 to identify edges that are not dangerous. When the edge 210 of the hole 212 in the slab 204 is analyzed, the system determines whether the maximum width of the hole 212 is above the hole threshold. If the maximum width of the hole 212 is less than the hole threshold, the edge 210 is a not dangerous edge and must be eliminated from the set of candidate edges. If the maximum width of the hole 212 is equal to or exceeds the hole threshold, the edge 210 of the hole 212 cannot yet be eliminated from the set of candidate edges.

Returning to FIG. 1, if one of the walls (e.g., 104) has an opening (e.g., 112) with a lower edge (e.g., 106), the system determines sill height of the opening by calculating a distance H (110) between the edge 106 of the opening 112 in the wall 104 and the slab 102 supporting the wall 104. If the distance H (110) exceeds the sill height threshold, the edge 106 is a not dangerous edge and must be eliminated from the set of candidate edges. If the distance H is equal to or less than the sill height threshold, the edge 106 stays in the set of candidate edges and needs to be further analyzed.

In some implementations, the candidate edges are divided into segments, forming a set of candidate segment, and the candidate segments are evaluated to identify not dangerous segments in the same manner as the candidate edges above.

In some implementations the thresholds and distances used by the system (e.g., the gap threshold, the hole threshold, the sill height threshold) are adjustable by the user. In other implementations the thresholds and distances are set in the system. Often these thresholds and distances are determined by the occupational safety and health (OSH) standards applicable in the geographic area where the building is located, such as OSHA in the United States, EU OSH in the European countries, HASWA in the United Kingdom, and ILO-OSH 2001 or OHSAS 18000 elsewhere.

The system also examines the candidate edges to identify protected edges and to eliminate them from the set of candidate edges. In some implementations the system starts evaluating the candidate edges to identify the protected edges after the shared edges, the edges of small holes and the lower edges of the wall opening with sufficient sill height have already been eliminated from the set of candidate edges. In other implementations, a different sequence of analysis steps is used.

Figure 3:
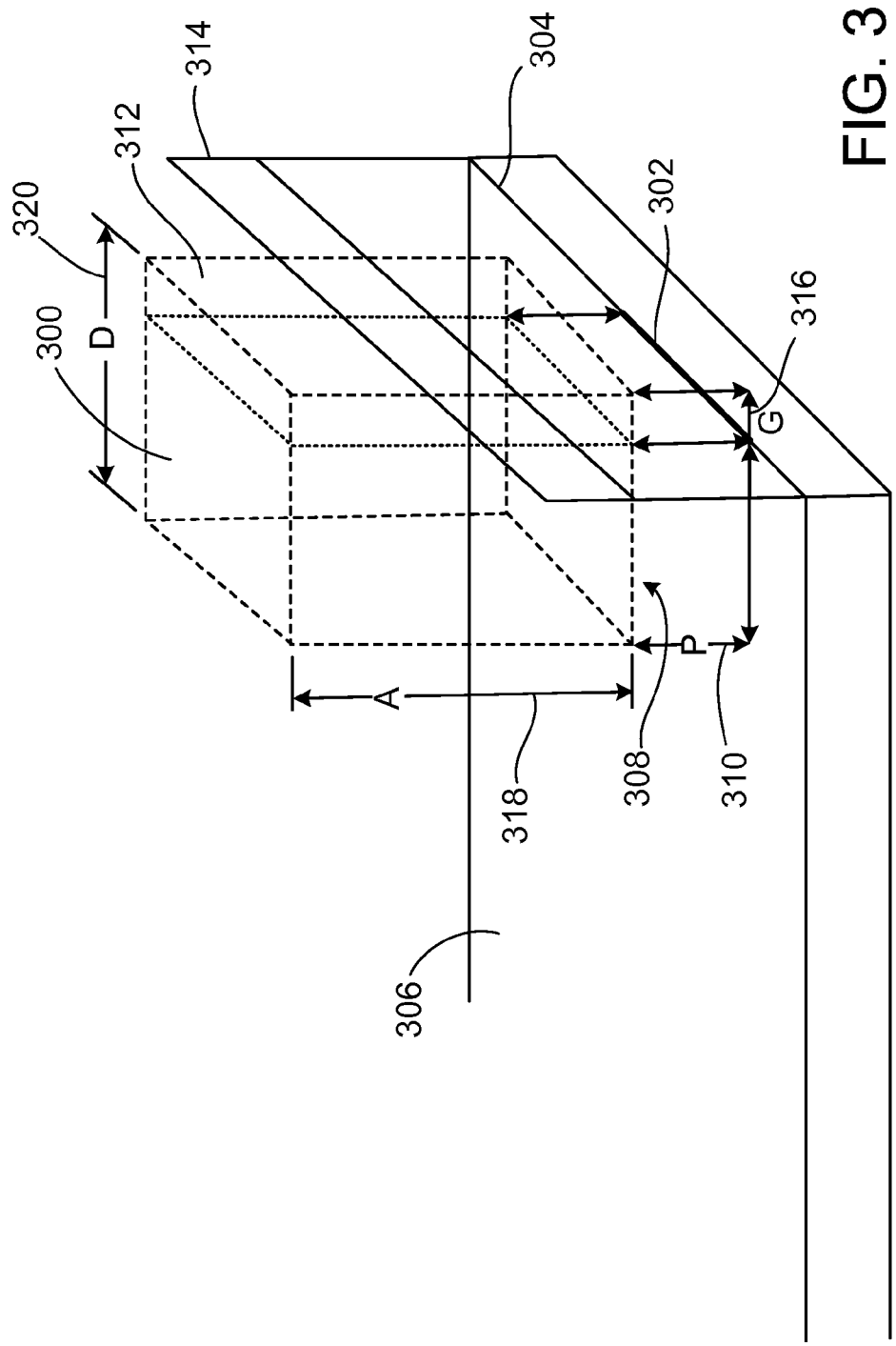
FIG. 3 is an illustration of an example view of a floor in a building information model showing an upper virtual box.

FIG. 3 is an illustration of an example view of a floor in a building information model showing an upper virtual box. It illustrates a process of identifying a protected segment in the set of candidate segments.

A protected segment is a candidate segment having an upper virtual box containing a protecting object. An upper virtual box (e.g. 300) is a rectangular space in a building model defined in relation to a segment 302 of an edge 304 of a building object (e.g., slab 306). A width of the upper virtual box 300 is equal to the length of the segment 302, and the upper virtual box 300 is positioned directly above the segment 302. The upper virtual box 300 is positioned partially on an interior side of the edge 304 containing the segment 302 and partially on an exterior side of the edge 304. A bottom face 308 of the upper virtual box 300 is a protection height P (310) above an elevation of the segment 302. An outward-facing wall 312 of the upper virtual box 300 is on the exterior side of the edge 304 and is offset a gap distance G (316) from the edge 304 of the segment 302. Other parameters of the upper virtual box, such as its depth D (320) and height A (318), are usually predefined in the system but can also be adjustable by a user. In other words, a segment of an edge is a protected segment when there is some type of adequate protection (e.g., a wall or a railing of acceptable height) already in place next to this segment.

After the upper virtual box 300 is identified for the segment 302, the system checks whether any portion of a protecting object is positioned within the upper virtual box 300. A protecting object is a building object that is capable of preventing people and materials from falling off an edge. In some implementations only walls, curtain walls, and railing are categorized as protecting objects. In other implementations other types of building objects can also be included in a category of protecting objects.

If a protecting object, such as railing 314, is identified within the upper virtual box 300, the segment 302 corresponding to the box is identified as a protected segment and is excluded from the set of candidate segments. If the system does not fine any portion of any protecting object in the upper virtual box 300, the segment 302 is not protected and cannot be eliminated from the set of candidate segments.

In some implementations, the edges (e.g., 304) are not divided into segments and an upper virtual box 300 spans the length of the edge. In some cases a combination of these approaches can be used.

The system also examines the candidate segments to identify low segments and to eliminate from the set of candidate edges. In some implementations the system starts evaluating the candidate segments to identify low segments after the protected segments already have been eliminated from the set of candidate segments. In other implementations, different sequence of analysis steps is used.

Figure 4:
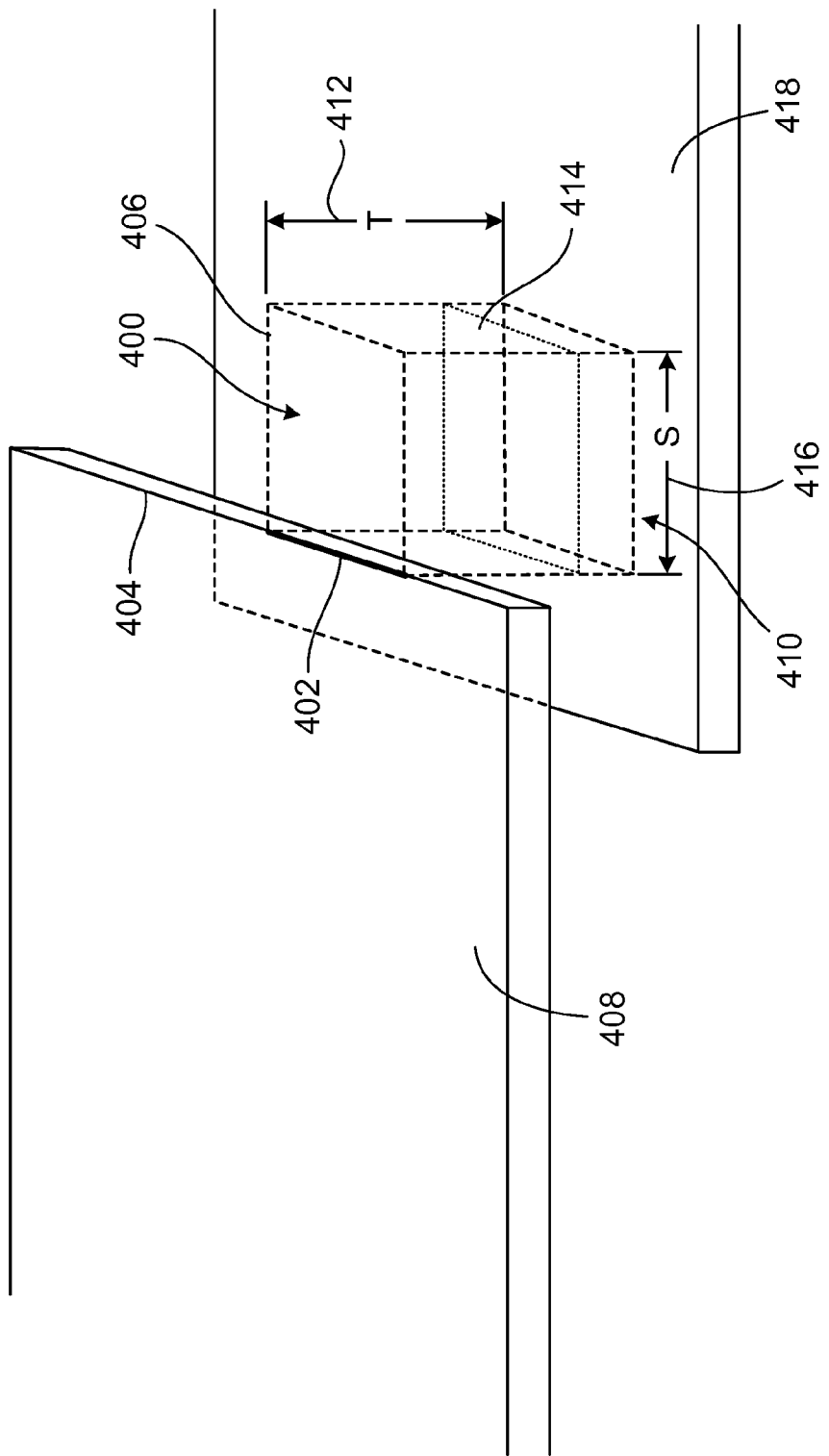
FIG. 4 is an illustration of an example view of a floor in a building information model showing a lower virtual box.

FIG. 4 is an illustration of an example view of a floor in a building information model showing a lower virtual box. It illustrates an example process of identifying low segments in the set of candidate segments.

A low segment is a candidate segment with lower virtual box containing a support, where an area of intersection between the support and the lower virtual box is at least a support area threshold portion of an area of a bottom face of the lower virtual box. A lower virtual box is a rectangular space in a building model defined in relation to a segment of an edge. The lower virtual box is positioned on an exterior side of the edge. A top face of the lower virtual box has the same elevation as a horizontal plain of the edge, and the bottom face of the lower virtual box is a safe drop threshold below the edge. In other words, a segment of an edge is a low segment when there is some type of adequate support, such as a slab or ground, already in place right below the segment and this support covers at least a predetermined portion of the lower virtual box On FIG. 4 a lower virtual box 400 is defined in relation to a candidate segment 402 of a candidate edge 404 which is an outer edge of a slab 408, positioned on an exterior side of the edge 404, and having its top face 406 at the same elevation as the slab 408. A distance between a bottom face 410 of the box 400 and the edge 404 is the safe drop distance T (412). A distance between the edge 404 and an outward facing wall 414 is a support width S (416). In some implementations T and S are predefined. In other implementations they can be adjusted by a user.

After the lower virtual box 400 is defined, the system checks whether any portion of any object that qualifies as a support is located within the box 400. FIG. 4 illustrates a situation where a portion of a lower slab 418 is located within the lower virtual box 400. The system determines that a portion of the slab 418 is located within the lower virtual box 400 and that the slab qualifies as a support. Then the system calculates an area of intersection between the slab 418 and the lower virtual box 400 and compares the area or intersection to the area of the bottom face of the box 400. If the area of the intersection is at least a support area threshold portion (usually about 90%) of the bottom face area, the support is considered adequate. In the illustration on FIG. 4, the area of the intersection and the area of the bottom face 410 are equal, and the system identifies the slab 418 as an adequate support for the segment 402. Then the system identifies the segment 402 as a low segment and eliminates it from the set of candidate segments.

If the system determines that there are no support building objects in the lower virtual box (e.g., 400) or that the area of intersection of the support and the box is below the support area threshold portion of the area of the bottom face of the lower virtual box, the segment (e.g., 402) is not a low segment, and it remains in the set of candidate segments.

In some implementations the system does not split the edges (e.g., 404) into segments, and creates a lower virtual box spanning the whole length of the edge to identify low edges.

Usually, after the low segments, the protected segments, the shared segments, the segments of the edges of small holes and the segment of the lower edges of the wall openings with sufficient sill height have been eliminated from the set of candidate edges, the system marks the candidate segments remaining in the set of candidate segments as dangerous.

When the dangerous segments are identified, the system evaluates the segments that are not marked as dangerous to identify segments with at least one neighboring candidate segment and marks them as dangerous also. This will provide an additional safety measure to ensure that protection does not extend exactly to an edge of a dangerous zone.

Figure 5:
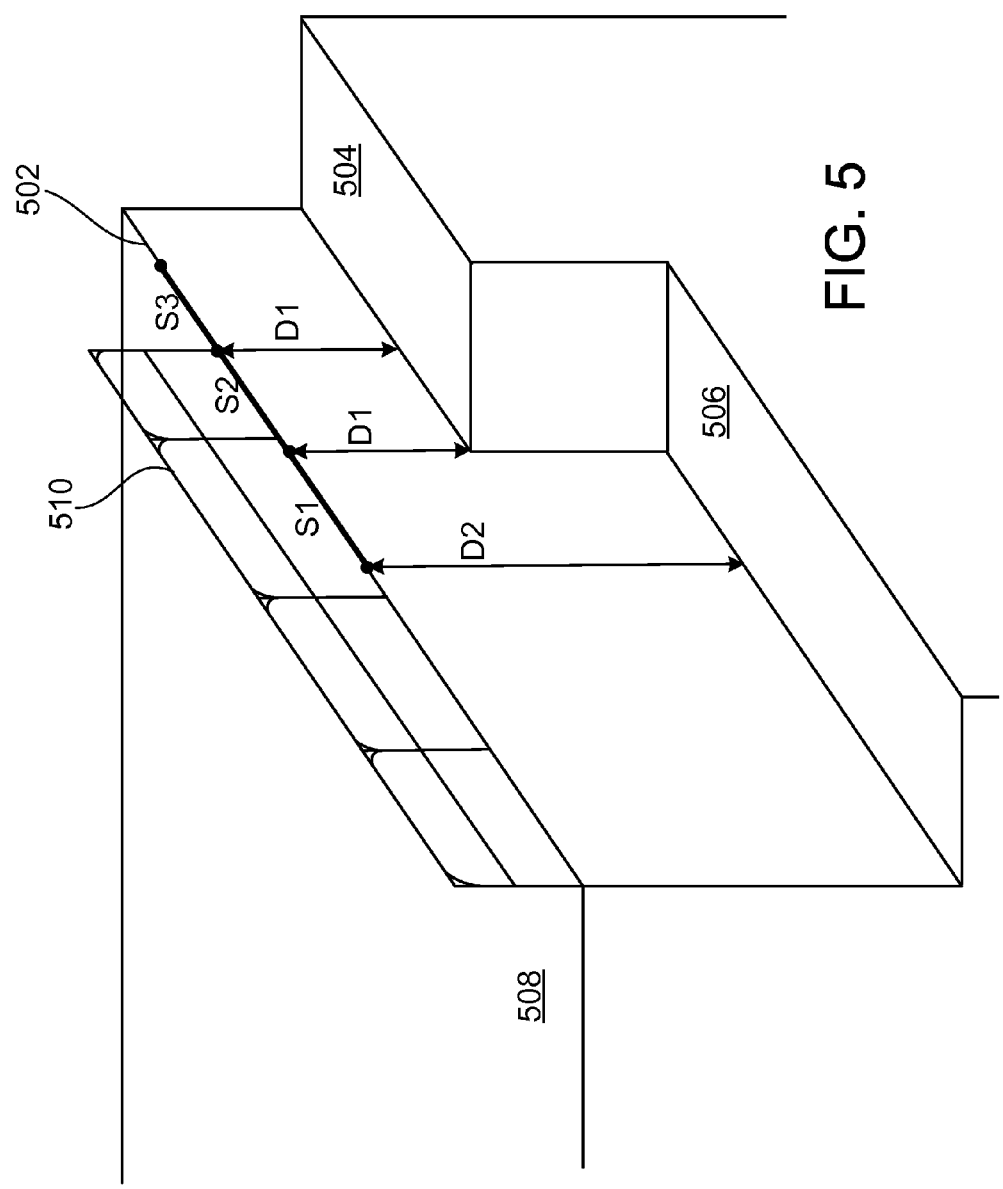
FIG. 5 is another illustration of an example view of a floor in a building information model.

FIG. 5 is another illustration of an example view of a floor in a building information model which we use to explain the evaluation process. Segments S1, S2 and S3 are neighboring segments belonging to an edge 502 of a slab 508. The distance D1 between the edge 502 and the first support 504 is less than the safe drop threshold. The distance D2, between the edge 502 and the second support 506 exceeds the safe drop threshold. Accordingly, when the system evaluates the segments of the edge 502 looking for low segments, it identifies the segments S2 and S3, located directly above the first support 504, as low segments and eliminates them from the set of candidate segments. The segment S1, located above the second support 506, remains in the set of candidate segments. After the segment S1 is marked as dangerous, the segments S2 and S3 are evaluated to determine whether they have any neighboring candidate segments. Segment S2 has a neighboring segment S1. Since S1 is a candidate segment, the system marks S2 as dangerous. Segment S3 does not have a neighboring candidate segment, and it remains unmarked. As a result, portions of the edge 502, corresponding to the segments S1 and S2 will be marked as dangerous and in need of protection, such as railing 510, to prevent people or materials from falling off the slab 508.

After the system completes the evaluation of the segments (or edges), it presents the building model to the user with the marked dangerous segments (or edges) highlighted.

Figure 6:
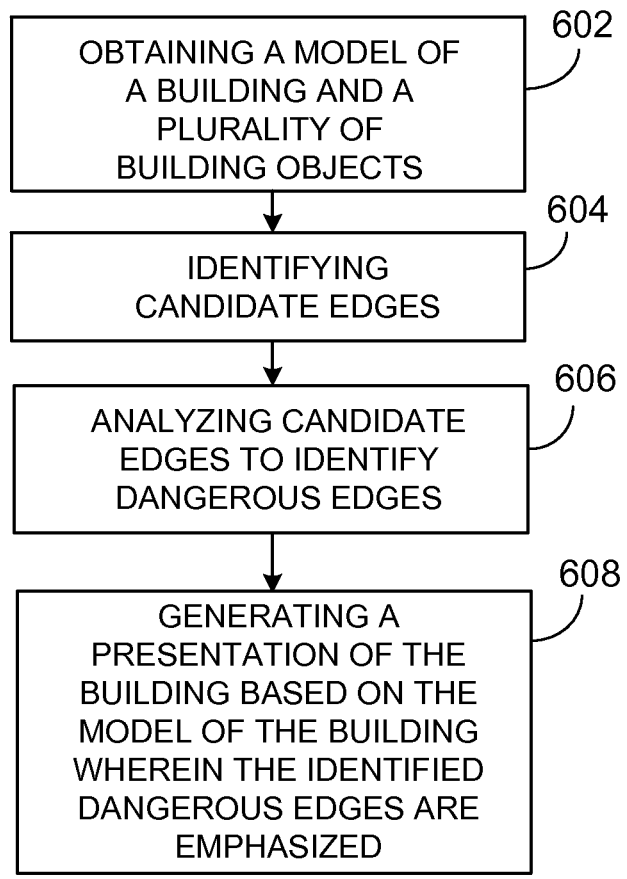
FIG. 6 is an example process for identifying dangerous edges.

FIG. 6 illustrates an example process for identifying dangerous edges in a model of a building.

In step 602, the model is obtained. The model contains information regarding the building objects having been constructed at the given point in time, such as their nature (e.g., a wall, a window, a slab), their locations, their relationships to each other, time of construction, and time of disassembling.

In step 604, the candidate edges are identified. The candidate edges are identified based on the building objects. The candidate edges include outer edges of the slabs, edges of the openings in the slabs, and lower edges of the openings in the walls.

In step 606, the candidate edges are analyzed to identify dangerous edges.

In step 608, the presentation of the building is generated based on the model of the building where the identified dangerous edges are emphasized.

Figure 7:
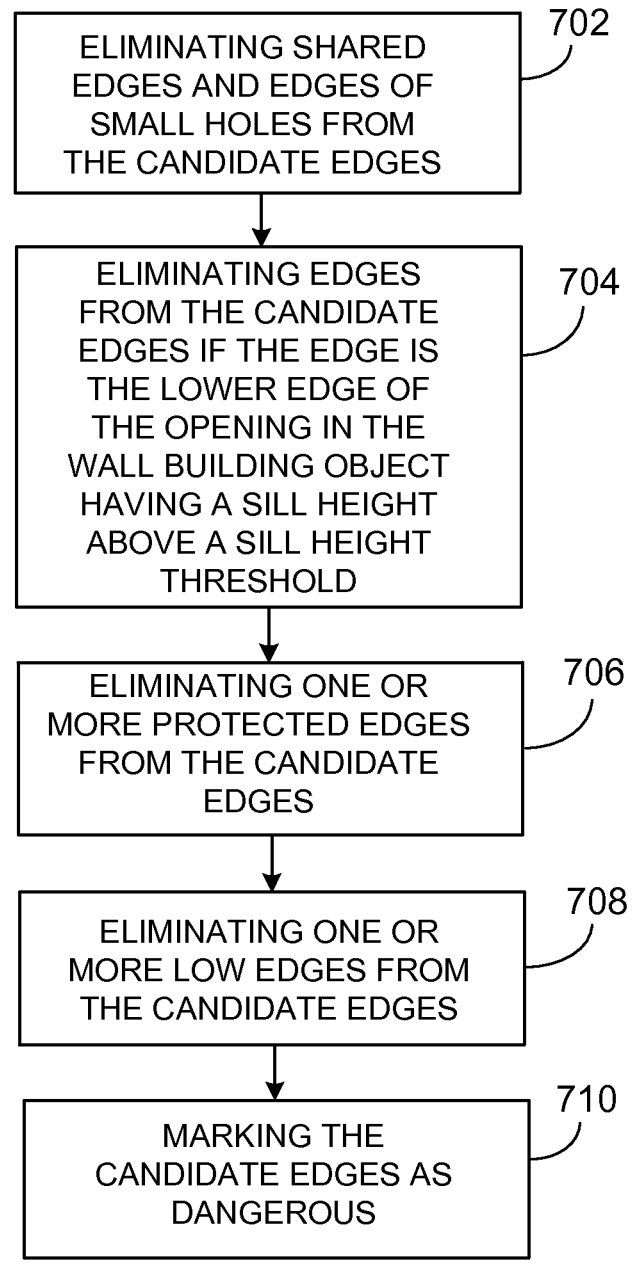
FIG. 7 is an example process for analyzing candidate edges.

FIG. 7 illustrates an example process for analyzing candidate edges. The various steps of the process can be implemented in computer software and performed, for example, by one or more data processing apparatus (e.g., servers, personal computers, tablet computers, and so on).

In step 702, the shared edges and the edges of small holes are eliminated from the candidate edges. Each candidate edge from the set of candidate edges is analyzed. If the candidate edge is an outer edge of a slab, the system checks whether the edge is a shared edge. All shared edges are eliminated from the set of candidate edges. All holes in the slabs are analyzed to identify holes having maximum width less than a hole threshold. The edges of such small holes are also eliminated them from the set of candidate edges.

In step 704, the lower edges of the openings in the walls having sill height above the sill height threshold are eliminated from the candidate edges. The system analyzes the lower edges of openings in walls, determines sill height of such edge, and if the sill height exceeds a sill height threshold, these edges are eliminated from the set of candidate edges.

In step 706, the protected edges are eliminated from the candidate edges. The system identifies an upper virtual box for each candidate edge and determines whether there are any protecting objects in the virtual box. If there are one or more protecting objects in the upper virtual box, the corresponding edge is protected and is eliminated from the set of candidate edges.

In step 708, the low edges are eliminated from the candidate edges. The system identifies a lower virtual box for each candidate edge and determines whether there are one or more supports in the lower box. If there are one or more supports in the lower virtual box, the corresponding edge is eliminated from the set of candidate edges.

In step 710, the remaining candidate edges are marked as dangerous.

Figure 8:
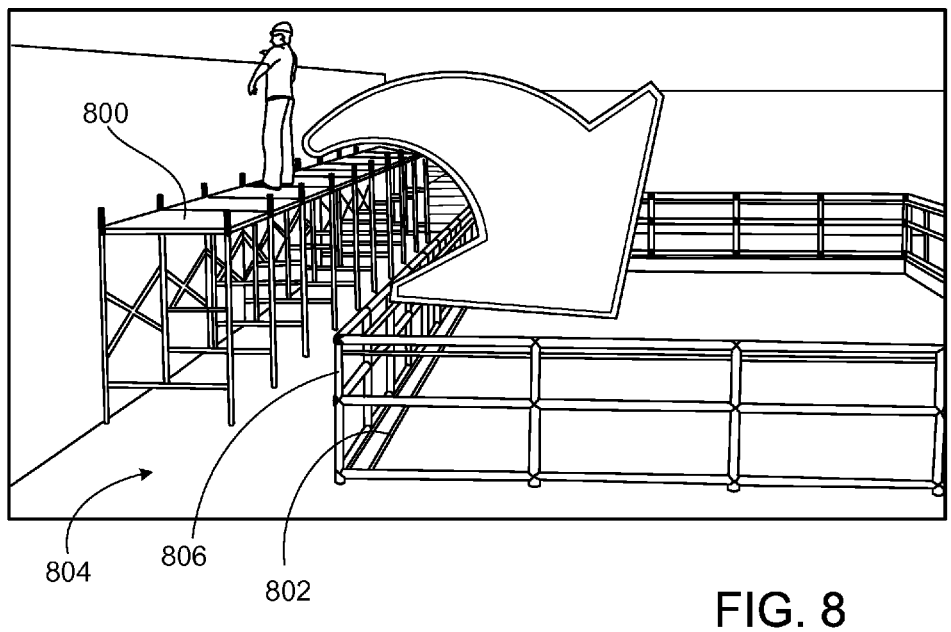
FIG. 8 is an illustration of an example view of a floor in a building information model showing an elevated work area.

In some implementations the system analyzes the building information model to detect a danger from falling off an elevated work area located in close proximity to an edge of a slab in the building. An elevated work area is a horizontal surface of a building object, positioned next to or within a building, and intended to support one or more workers in the construction of a building. FIG. 8 illustrates an example view of a floor in a building information model showing an elevated work area 800 located in close proximity to an edge 802 of a slab 804.

Figure 9:
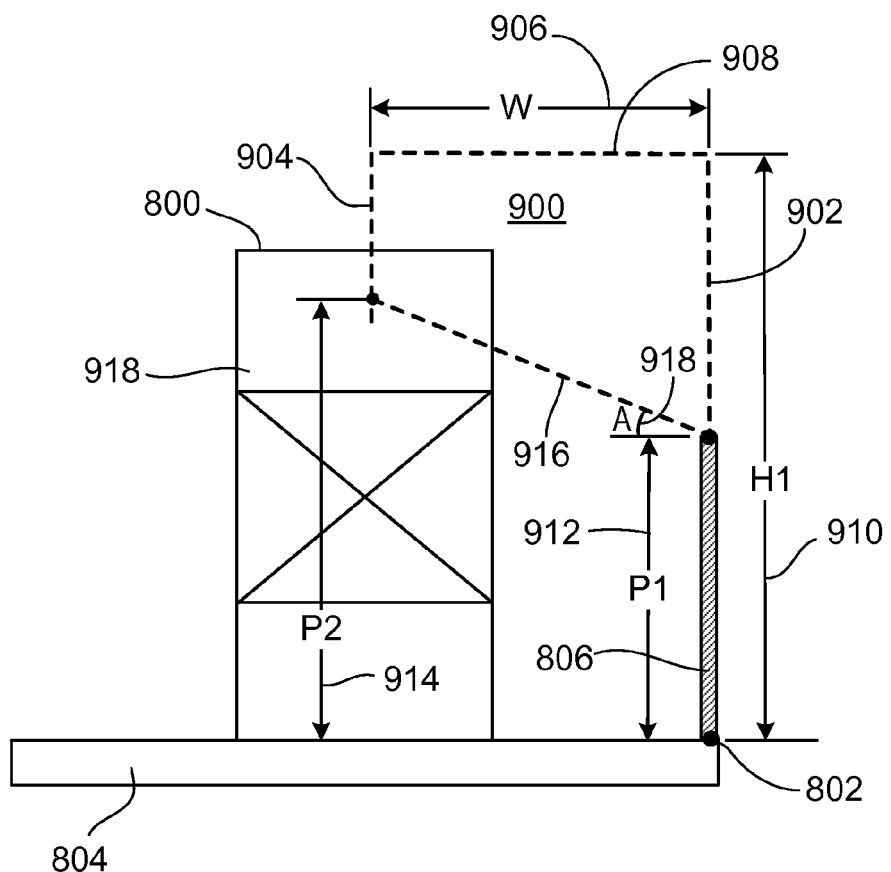
FIG. 9 is an illustration of an example view of a floor in a building information model showing a buffer virtual box.

In order to identify segments of the edges having elevated working area in close proximity, the system creates a buffer box corresponding to the segment. FIG. 9 is an illustration of an example side view of a floor in a building information model showing a buffer virtual box. It illustrates an example process of analyzing segments from the set of candidate segments to identify the segments in need of additional protection to prevent falling off an elevated work area.

A segment needs additional protection to prevent falls off an elevated work area, if there is a work area within a buffer virtual box corresponding to this segment. A buffer virtual box (e.g. 900) is a virtual space shaped like a wedge. It is defined in relation to a segment (not shown) of an edge (e.g. 802). A width of the buffer virtual box 900 is equal to the length of the segment, and the buffer virtual box 900 is positioned directly above the segment. The buffer virtual box 900 is positioned on an interior side of the edge 802. An outward facing wall 902 of the virtual box 900 is positioned directly above the edge 802. The top edge of the outward facing wall 902 is a buffer virtual box height H1 (910) above the slab 804; and the bottom edge of this wall 902 is a buffer protection height P1 (912) above the slab 804. In some implementations P1 is equal to the protection height, the height of the railings (e.g. 806) or other protection objects in the building.

The inward facing wall 904 is positioned inward at a distance W (906) from the edge 802 with its top edge the buffer virtual box height H1 above the slab 804 and its bottom edge a work are protection height P2 (914) above the slab 804. A top face 908 of the virtual box 900 is positioned at the buffer virtual box height H1 (910) above the slab 804. A bottom face 916 of the buffer virtual box 900 slopes from the lower edge of the inward facing wall 904 to the lower edge of the outward facing wall 902. In some implementations the bottom face 916 is defined by an angle A (918) between the bottom face 916 and a horizontal plane. In other implementations the bottom face 916 is defined by a work area protection height P2 (914).

In some implementations H1, P1, P2, and W and other parameters of the buffer virtual box 900 are predefined. In other implementations the parameters of the buffer virtual box 900 can be set or adjusted by a user.

After the buffer virtual box 900 is identified for the segment 902, the system checks whether any portion of a building object (e.g. 918) having an elevated work area (800) is positioned within the buffer virtual box 900. In some implementations the system only checks whether there is any scaffolding or an elevated platform in the buffer virtual box 900. In other implementations the system also checks for other building objects. If such object is identified in the buffer virtual box, the system marks the corresponding segment 902 as in need of additional protection.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining a model of a building wherein the model comprises a representation of the building at a point in time in construction of the building, and wherein the model contains a plurality of building objects that are indicated as being present in the building at the point in time by a construction schedule;
   processing the plurality of building objects including for a given building object of the plurality of building objects, identifying candidate edges of the given building object, wherein a candidate edge is an outer edge of a slab building object, an edge of an opening in a slab building object, or a lower edge of an opening in a wall building object, and processing the candidate edges to locate dangerous edges, wherein a dangerous edge is a candidate edge that is accessible and presents a risk of falling;
   wherein processing the candidate edges includes:
      identifying a protected edge, wherein the protected edge is a respective candidate edge having a first virtual box containing a protection object that minimizes or removes the risk of falling associated with the respective candidate edge based on a position of the protection object and the respective candidate edge, wherein the first virtual box is positioned partially on an interior side of the respective candidate edge and partially on an exterior side of the respective candidate edge, a bottom face of the first virtual box is a protection height beyond the respective candidate edge, and an outward-facing wall of the first virtual box is on the exterior side of the respective candidate edge and is offset a gap distance from the respective candidate edge;
      eliminating the identified protected edge from the candidate edges of the given building object forming a modified candidate set; and
      locating dangerous edges in the modified candidate set; and
         generating, by one or more processors, a presentation of the building based on the model of the building wherein one or more of the located dangerous edges are emphasized in the presentation.

2. The method of claim 1 wherein identifying the candidate edges comprises:
   eliminating one or more shared edges from the candidate edges wherein a shared edge is an edge between two slab building objects whose top surfaces have a same elevation and wherein a gap between the two slab building objects is less than a gap threshold; and
   eliminating one or more hole edges from the candidate edges when a maximum width of a hole defined by the one or more hole edges is less than a hole threshold.

3. The method of claim 1 wherein identifying the candidate edges comprises:

eliminating each of one or more edges from the candidate edges if the edge is the lower edge of an opening in a wall building object having a sill height beyond a sill height threshold.

4. The method of claim 1 further comprising:
splitting the candidate edges into candidate segments; and
wherein analyzing the candidate edges comprises analyzing at least one candidate segment separately from the other candidate segments.

5. The method of claim 4 wherein two or more of the candidate segments have equal length.

6. The method of claim 1 wherein the protection object is a wall, a curtain wall, or a railing.

7. The method of claim 1, further comprising:
dividing the candidate edge into a plurality of candidate segments; and
analyzing each candidate segment as a distinct candidate segment separately from the other candidate segments.

8. The method of claim 1 further comprising:
eliminating one or more low edges from the candidate edges wherein a low edge is a candidate edge having a second virtual box containing a support which has an area of an intersection with the second virtual box that is at least a support area threshold portion of an area of a bottom face of the second virtual box;
wherein the second virtual box is positioned on the exterior side of the candidate edge, a top face of the second virtual box has a same elevation as the candidate edge, a bottom face of the second virtual box is a safe drop distance below the candidate edge, and a width of the second virtual box is a support width threshold; and
marking the candidate edges that are not eliminated as dangerous edges.

9. The method of claim 8 wherein the support is a slab, a site, or ground.

10. The method of claim 8 further comprising:
dividing the candidate edge into a plurality of candidate segments; and
analyzing each candidate segment as a distinct candidate segment separately from the other candidate segments.

11. The method of claim 10 further comprising:
marking the candidate segments as dangerous segments; and
if a segment eliminated from the candidate segments has at least one neighboring segment that is a candidate segment, marking the eliminated segment as a dangerous segment.

12. A system comprising:
a machine-readable storage device having instructions stored thereon; and
data processing apparatus operable to execute the instructions to perform operations comprising:
obtaining a model of a building wherein the model comprises representation of the building at a point in time in construction of the building, and wherein the model contains a plurality of building objects that are indicated as being present in the building at the point in time by a construction schedule;
processing the plurality of building objects including for a given building object of the plurality of building objects, identifying candidate edges of the given building object, wherein a candidate edge is an outer edge of a slab building object, an edge of an opening in a slab building object, or a lower edge of an opening in a wall building object, and processing the candidate edges to locate dangerous edges, wherein a dangerous edge is a candidate edge that is accessible and presents a risk of falling;
wherein processing the candidate edges includes:
identifying a protected edge, wherein the protected edge is a respective candidate edge having a first virtual box containing a protection object that minimizes or removes the risk of falling associated with the respective candidate edge based on a position of the protection object and the respective candidate edge, wherein the first virtual box is positioned partially on an interior side of the respective candidate edge and partially on an exterior side of the respective candidate edge, a bottom face of the first virtual box is a protection height beyond the respective candidate edge, and an outward-facing wall of the first virtual box is on the exterior side of the respective candidate edge and is offset a gap distance from the respective candidate edge;
eliminating the identified protected edge from the candidate edges of the given building object forming a modified candidate set; and
locating dangerous edges in the modified candidate set; and
generating a presentation of the building based on the model of the building wherein one or more of the located dangerous edges are emphasized in the presentation.

13. The system of claim 12 wherein identifying the candidate edges comprises:
eliminating one or more shared edges from the candidate edges wherein a shared edge is an edge between two slab building objects whose top surfaces have a same elevation and wherein a gap between the two slab building objects is less than a gap threshold; and
eliminating one or more hole edges from the candidate edges when a maximum width of a hole defined by the one or more hole edges is less than a hole threshold.

14. The system of claim 12 wherein identifying the candidate edges comprises:
eliminating each of one or more edges from the candidate edges if the edge is the lower edge of an opening in a wall building object having a sill height beyond a sill height threshold.

15. The system of claim 12, wherein the operations further comprise:
splitting the candidate edges into candidate segments; and
wherein analyzing the one or more candidate edges comprises analyzing at least one candidate segment separately from the other candidate segments.

16. The system of claim 15 wherein two or more of the candidate segments have equal length.

17. The system of claim 12 wherein the protection object is a wall, a curtain wall, or a railing.

18. The system of claim 12, wherein the operations further comprise:
dividing the candidate edge into a plurality of candidate segments; and
analyzing each candidate segment as a distinct candidate segment separately from the other candidate segments.

19. The system of claim 12, wherein the operations further comprise:
eliminating one or more low edges from the candidate edges wherein a low edge is a candidate edge having a second virtual box containing a support which has an area of an intersection with the second virtual box that is at least a support area threshold portion of an area of a bottom face of the second virtual box;

wherein the second virtual box is positioned on the exterior side of the candidate edge, a top face of the second virtual box has a same elevation as the candidate edge, a bottom face of the second virtual box is a safe drop distance below the candidate edge, and a width of the second virtual box is a support width threshold; and marking the candidate edges that are not eliminated as dangerous edges.

20. The system of claim 19 wherein the support is a slab, a site, or ground.

21. The system of claim 19 wherein the operations further comprise:

dividing the candidate edge into a plurality of candidate segments; and analyzing each candidate segment as a distinct candidate segment separately from the other candidate segments.

22. The system of claim 21 wherein the operations further comprise:

marking the candidate segments as dangerous segments; and if a segment eliminated from the candidate segments has at least one neighboring segment that is a candidate segment, marking the eliminated segment as a dangerous segment.

23. A non-transitory storage device having instructions stored thereon that, when executed by data processing apparatus, cause the data processing apparatus to perform operations comprising:

obtaining a model of a building wherein the model comprises representation of the building at a point in time in construction of the building, and wherein the model contains a plurality of building objects that are indicated as being present in the building at the point in time by a construction schedule;

processing the plurality of building objects including for a given building object of the plurality of building objects, identifying candidate edges of the given building object, wherein a candidate edge is an outer edge of a slab building object, an edge of an opening in a slab building object, or a lower edge of an opening in a wall building object, and processing the candidate edges to locate dangerous edges, wherein a dangerous edge is a candidate edge that is accessible and presents a risk of falling;

wherein processing the candidate edges includes:

identifying a protected edge, wherein the protected edge is a respective candidate edge having a first virtual box containing a protection object that minimizes or removes the risk of falling associated with the respective candidate edge based on a position of the protection object and the respective candidate edge, wherein the first virtual box is positioned partially on an interior side of the respective candidate edge and partially on an exterior side of the respective candidate edge, a bottom face of the first virtual box is a protection height beyond the respective candidate edge, and an outward-facing wall of the first virtual box is on the exterior side of the respective candidate edge and is offset a gap distance from the respective candidate edge;

eliminating the protected edge from the candidate edges of the given building object forming a modified candidate set; and locating dangerous edges in the modified candidate set; and generating a presentation of the building based on the model of the building wherein one or more of the located dangerous edges are emphasized in the presentation.

24. The storage device of claim 23 wherein identifying the candidate edges comprises:

eliminating one or more shared edges from the candidate edges wherein a shared edge is an edge between two slab building objects whose top surfaces have a same elevation and wherein a gap between the two slab building objects is less than a gap threshold; and eliminating one or more hole edges from the candidate edges when a maximum width of a hole defined by the one or more hole edges is less than a hole threshold.

25. The storage device of claim 23 wherein identifying the candidate edges comprises:

eliminating each of one or more edges from the candidate edges if the edge is the lower edge of an opening in a wall building object having a sill height beyond a sill height threshold.

26. The storage device of claim 23 further comprising:

splitting the candidate edges into candidate segments; and wherein analyzing the candidate edges comprises analyzing at least one candidate segment separately from the other candidate segments.

27. The storage device of claim 26 wherein two or more of the candidate segments have equal length.

28. The storage device of claim 23, wherein the protection object is a wall, a curtain wall, or a railing.

29. The storage device of claim 23 wherein the operations further comprise:

dividing the candidate edge into a plurality of candidate segments; and analyzing each candidate segment as a distinct candidate segment separately from the other candidate segments.

30. The storage device of claim 23 wherein the operations further comprise:

eliminating one or more low edges from the candidate edges wherein a low edge is a candidate edge having a second virtual box containing a support which has an area of an intersection with the second virtual box that is at least a support area threshold portion of an area of a bottom face of the second virtual box;

wherein the second virtual box is positioned on the exterior side of the candidate edge, a top face of the second virtual box has a same elevation as the candidate edge, a bottom face of the second virtual box is a safe drop distance below the candidate edge, and a width of the second virtual box is a support width threshold; and marking the candidate edges that are not eliminated as dangerous edges.

31. The storage device of claim 30, wherein the support is a slab, a site, or ground.

32. The storage device of claim 30 wherein the operations further comprise:

dividing the candidate edge into a plurality of candidate segments; and analyzing each candidate segment as a distinct candidate segment separately from the other candidate segments.

33. The storage device of claim 32 wherein the operations further comprise:

marking the candidate segments as dangerous segments; and if a segment eliminated from the candidate segments has at least one neighboring segment that is a candidate segment, marking the eliminated segment as a dangerous segment.

* * * * *